United States Patent
Guerra et al.

(10) Patent No.: US 12,470,144 B2
(45) Date of Patent: Nov. 11, 2025

(54) BUCK-BOOST BOOT REFRESHER CIRCUIT

(71) Applicant: STMicroelectronics S.r.l., Agrate Brianza (IT)

(72) Inventors: Ranieri Guerra, S. Giovanni la Punta (IT); Leandro Grasso, Sortino (IT); Serena Angela Versace, Villa San Giovanni (IT); Francesca Giacoma Mignemi, S. Giovanni la Punta (IT); Nunzio Greco, Camporotondo Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 270 days.

(21) Appl. No.: 18/155,407

(22) Filed: Jan. 17, 2023

(65) Prior Publication Data
US 2023/0246550 A1   Aug. 3, 2023

(30) Foreign Application Priority Data
Feb. 3, 2022   (IT) .................. 102022000001883

(51) Int. Cl.
*H02M 3/158* (2006.01)
*H02M 1/08* (2006.01)
*H02M 3/157* (2006.01)

(52) U.S. Cl.
CPC ........... *H02M 3/1582* (2013.01); *H02M 1/08* (2013.01); *H02M 3/157* (2013.01)

(58) Field of Classification Search
CPC .................. H02M 3/1582; H02M 1/0006
See application file for complete search history.

(56) References Cited

U.S. PATENT DOCUMENTS

| | | | |
|---|---|---|---|
| 7,848,125 B2 | 12/2010 | Miller | |
| 2013/0021015 A1* | 1/2013 | Moussaoui | H02M 3/1582 323/311 |
| 2017/0207703 A1* | 7/2017 | Houston | H02M 3/1582 |
| 2018/0109179 A1* | 4/2018 | Zhao | H02M 3/1582 |
| 2019/0238051 A1* | 8/2019 | Li | H02M 1/08 |
| 2019/0326817 A1 | 10/2019 | Zhang | |

FOREIGN PATENT DOCUMENTS

CN   113572352 A   10/2021

OTHER PUBLICATIONS

Moon, Jiho et al., "60-V Non-Inverting Four-Mode Buck-Boost Converter With Bootstrap Sharing for Non-Switching Power Transistors", IEEE Access, South Korea, 11 pages, Nov. 17, 2020.

* cited by examiner

*Primary Examiner* — Alex Torres-Rivera
(74) *Attorney, Agent, or Firm* — Slater Matsil, LLP

(57) ABSTRACT

In accordance with an embodiment, a method of operating a buck-boost power supply includes operating the buck-boost power supply in a buck mode by providing a PWM signal to a first half-bridge circuit, and turning on a charge transfer switch coupled between a first boosted supply node of a second driver circuit coupled to the first half-bridge circuit and a second boosted supply node of a second driver circuit coupled to a second half-bridge circuit when a voltage between the second boosted supply node and an output of the second half-bridge circuit is below a first threshold; and operating the buck-boost power supply in a boost mode by providing a PWM signal to the second half-bridge circuit, and turning on the charge transfer switch when the voltage between the first boosted supply node and an output of the first half-bridge circuit is below a second threshold.

20 Claims, 6 Drawing Sheets

BUCK-BOOST BOOT REFRESHER CIRCUIT

CROSS-REFERENCE TO RELATED APPLICATIONS

This application claims the benefit of Italian Patent Application No. 102022000001883, filed on Feb. 3, 2022, which application is hereby incorporated herein by reference.

TECHNICAL FIELD

The description generally relates to electronic circuits and systems and more particularly to a buck-boost refresher circuit.

BACKGROUND

Pure buck DC-DC converters and pure boost DC-DC converters may not be able to operate correctly when the expected output voltage $V_{out}$ is very close to the converter input voltage $V_{in}$, because in that case the duty-cycle of the pulse-width modulated (PWM) signal that drives the commutation of the converter switching stage tends to be close to 1 (or, equivalently, 100%). In such a condition, the driver circuits that drive the switching elements of the converter would be demanded to operate at a fast pace, which typically cannot be achieved in conventional converters.

A non-inverting buck-boost DC-DC converter is a type of DC-DC converter that relies on a full-bridge switching architecture and can produce an output voltage $V_{out}$ whose value can be also equal to the value of the converter input voltage $V_{in}$ ($V_{out} \approx V_{in}$).

If demanded by the application, a buck-boost converter may be driven to operate in pure buck mode or in pure boost mode as well. In the case of a full-bridge switching architecture including only n-channel metal-oxide-semiconductor (NMOS) transistors (i.e., a full-bridge architecture where also the high-side switches are implemented as NMOS transistors), operation of the converter may rely on the provision of two dedicated bootstrap circuits configured to supply, through external capacitances storing energy, the driver circuits that drive the high-side switches while each power half-bridge circuit is switching.

The bootstrap circuitry may also include bootstrap voltage refresher circuitry that is able to supply energy to the inactive (i.e., not switching) half-bridge circuit when the converter is operating in pure buck mode or pure boost mode. According to certain known solutions, the refresher circuitry may turn out to be complex, occupy a large silicon area and/or have a low efficiency.

Therefore, there is a need in the art to provide buck-boost DC-DC converters including improved bootstrap voltage refresher circuitry.

SUMMARY

One or more embodiments may relate to a corresponding method of operating a buck-boost DC-DC converter.

In one or more embodiments, a buck-boost converter circuit includes an input node configured to receive an input voltage and an output node configured to provide an output voltage. The converter includes a first half-bridge circuit arranged between the input node and a ground node, the first half-bridge circuit including a first high-side switch arranged between the input node and a first switching node, and a first low-side switch arranged between the first switching node and the ground node. The converter includes a second half-bridge circuit arranged between the output node and the ground node, the second half-bridge circuit including a second high-side switch arranged between the output node and a second switching node, and a second low-side switch arranged between the second switching node and the ground node. The converter includes a control circuit configured to receive a first control signal indicative, if asserted, of the buck-boost converter circuit operating in buck mode and a second control signal indicative, if asserted, of the buck-boost converter circuit operating in boost mode, the control circuit being further configured to produce a buck pulse-width modulated control signal and a boost pulse-width modulated control signal. The converter includes a first high-side driver circuit configured to receive the buck pulse-width modulated control signal and drive the first high-side switch as a function thereof. The first high-side driver circuit is biased between a first high-side supply voltage node and the first switching node. The converter includes a second high-side driver circuit configured to receive the boost pulse-width modulated control signal and drive the second high-side switch as a function thereof. The second high-side driver circuit is biased between a second high-side supply voltage node and the second switching node. A first bootstrap circuit is configured to be selectively conductive from a reference voltage node towards the first high-side supply voltage node, and a second bootstrap circuit is configured to be selectively conductive from the reference voltage node towards the second high-side supply voltage node. A first voltage sensing circuit is configured to sense a voltage between the first high-side supply voltage node and the first switching node, and to assert a first activation signal in response to the sensed voltage being lower than a first threshold. A second voltage sensing circuit is configured to sense a voltage between the second high-side supply voltage node and the second switching node, and to assert a second activation signal in response to the sensed voltage being lower than a second threshold. At least one charge transfer switch is directly connected between the first high-side supply voltage node and the second high-side supply voltage node. The converter includes bootstrap refresher control circuitry configured to close the at least one charge transfer switch in response to:

i) the first control signal being asserted, the first high-side switch being conductive and the second activation signal being asserted, or ii) the second control signal being asserted, the second high-side switch being conductive and the first activation signal being asserted.

One or more embodiments may thus provide a buck-boost DC-DC converter including a bootstrap voltage refresher circuit that is simple, occupies a small silicon area and/or has an improved efficiency.

In one or more embodiments, the first high-side switch, the first low-side switch, the second high-side switch and the second low-side switch include n-channel MOS transistors.

In one or more embodiments, the at least one charge transfer switch includes at least one p-channel MOS transistor.

In one or more embodiments, the at least one charge transfer switch includes a first charge transfer switch directly connected between the first high-side supply voltage node and an intermediate node of a charge transfer path, and a second charge transfer switch directly connected between the second high-side supply voltage node and the intermediate node of the charge transfer path.

In one or more embodiments, the at least one charge transfer switch includes at least one switch having a selectable resistance value. The bootstrap refresher control circuitry is further configured to determine a voltage difference between the first high-side supply voltage node and the second high-side supply voltage node, and set a resistance value of the at least one charge transfer switch as a function of the determined voltage difference. A higher resistance value of the at least one charge transfer switch is set in response to a higher value of the determined voltage difference.

In one or more embodiments, the at least one charge transfer switch includes a plurality of selectively activatable switches connected in parallel. The bootstrap refresher control circuitry is configured to produce respective control signals for activating the selectively activatable switches connected in parallel as a function of the determined voltage difference. A lower number of switches connected in parallel are activated in response to a higher value of the determined voltage difference.

In one or more embodiments, the bootstrap refresher control circuitry is configured to determine the voltage difference between the first high-side supply voltage node and the second high-side supply voltage node as a difference between the input voltage and the output voltage.

In one or more embodiments, the bootstrap refresher control circuitry is configured to determine the voltage difference between the first high-side supply voltage node and the second high-side supply voltage node as a function of the output voltage and at least one of a duty-cycle of the buck pulse-width modulated control signal and a duty-cycle of the boost pulse-width modulated control signal.

In one or more embodiments, the first voltage sensing circuit includes a first voltage-to-current converter circuit configured to produce a first output current indicative of the voltage between the first high-side supply voltage node and the first switching node, a first resistance coupled to the ground node and arranged to receive the first output current to produce a first voltage signal indicative of the voltage between the first high-side supply voltage node and the first switching node, and a first comparator configured to compare the first voltage signal to the first threshold and assert the first activation signal in response to the first voltage signal being lower than the first threshold. The second voltage sensing circuit includes a second voltage-to-current converter circuit configured to produce a second output current indicative of the voltage between the second high-side supply voltage node and the second switching node, a second resistance coupled to the ground node and arranged to receive the second output current to produce a second voltage signal indicative of the voltage between the second high-side supply voltage node and the second switching node, and a second comparator configured to compare the second voltage signal to the second threshold and assert the second activation signal in response to the second voltage signal being lower than the second threshold.

In one or more embodiments, the first bootstrap circuit includes a semiconductor junction (e.g., a diode, a diode-connected transistor, or the like) having an anode terminal coupled to the reference voltage node and a cathode terminal coupled to the first high-side supply voltage node. The second bootstrap circuit includes a semiconductor junction (e.g., a diode, a diode-connected transistor, or the like) having an anode terminal coupled to the reference voltage node and a cathode terminal coupled to the second high-side supply voltage node.

In one or more embodiments, the first bootstrap circuit includes a first bootstrap switch arranged between the reference voltage node and the first high-side supply voltage node, and the second bootstrap circuit includes a second bootstrap switch arranged between the reference voltage node and the second high-side supply voltage node. The circuit includes control circuitry configured to close the first bootstrap switch in response to the first low-side switch being conductive and the first high-side switch being non-conductive, and close the second bootstrap switch in response to the second low-side switch being conductive and the second high-side switch being non-conductive.

In one or more embodiments, a method of operating a buck-boost converter circuit includes receiving an input voltage at the input node. The method includes receiving, at the control circuit, a first control signal indicative, if asserted, of the buck-boost converter circuit operating in buck mode and a second control signal indicative, if asserted, of the buck-boost converter circuit operating in boost mode. The method includes producing, at the control circuit, a buck pulse-width modulated control signal and a boost pulse-width modulated control signal. The method includes receiving, at the first high-side driver circuit, the buck pulse-width modulated control signal and driving the first high-side switch as a function thereof. The method includes receiving, at the second high-side driver circuit, the boost pulse-width modulated control signal and driving the second high-side switch as a function thereof. The method includes sensing, at the first voltage sensing circuit, a voltage between the first high-side supply voltage node and the first switching node, and asserting a first activation signal in response to the sensed voltage being lower than a first threshold. The method includes sensing, at the second voltage sensing circuit, a voltage between the second high-side supply voltage node and the second switching node, and asserting a second activation signal in response to the sensed voltage being lower than a second threshold. The method includes closing the at least one charge transfer switch in response to:
i) the first control signal being asserted, the first high-side switch being conductive and the second activation signal being asserted, or
ii) the second control signal being asserted, the second high-side switch being conductive and the first activation signal being asserted.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1:
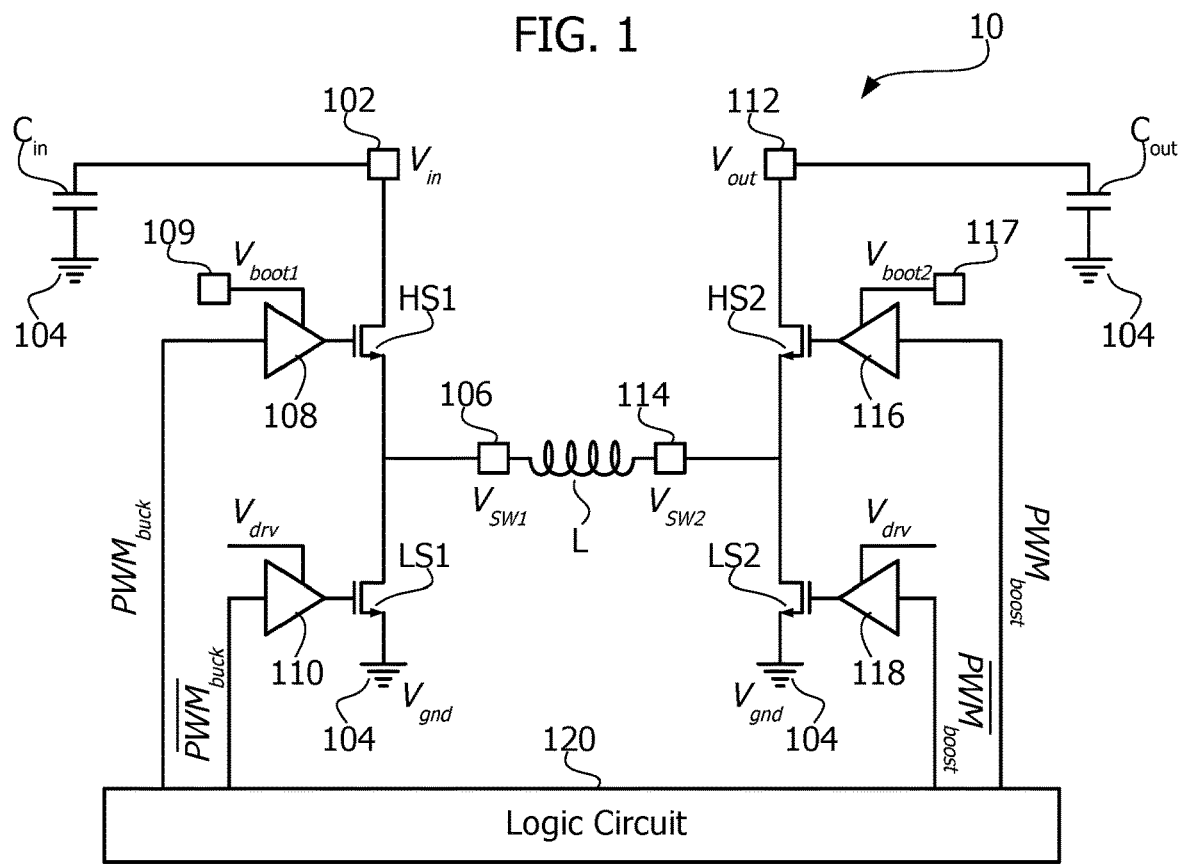
FIG. 1 is a circuit diagram exemplary of a non-inverting buck-boost DC-DC converter.

By way of introduction to the detailed description of exemplary embodiments, reference may first be made to FIG. 1, which is a circuit diagram exemplary of a buck-boost DC-DC converter 10.

The converter 10 includes a first half-bridge circuit (e.g., a buck half-bridge) arranged between an input node 102 that provides an input voltage $V_{in}$ and a reference (or ground) node 104 that provides a reference (or ground) voltage $V_{gnd}$. The first half-bridge circuit includes a first high-side switch HS1 arranged between the input node 102 and a first intermediate (switching) node 106, and a first low-side switch LS1 arranged between the intermediate node 106 and the reference node 104. The high-side switch HS1 is driven by a driver circuit 108 that is supplied by a voltage $V_{boot1}$ from a supply node 109 and receives a buck PWM control signal $PWM_{buck}$, and the low-side switch LS1 is driven by a driver circuit 110 that is supplied by a voltage $V_{drv}$ and receives the complement signal $\overline{PWM_{buck}}$ of the buck PWM control signal $PWM_{buck}$. The converter 10 includes a second half-bridge circuit (e.g., a boost half-bridge) arranged between an output node 112 that provides the output voltage $V_{out}$ and the ground node 104 that provides the ground voltage $V_{gnd}$. The second half-bridge circuit includes a second high-side switch HS2 arranged between the output node 112 and a second intermediate (switching) node 114, and a second low-side switch LS2 arranged between the intermediate node 114 and the ground node 104. The high-side switch HS2 is driven by a driver circuit 116 that is supplied by a voltage $V_{boot2}$ from a supply node 117 and receives a boost PWM control signal $PWM_{boost}$, and the low-side switch LS2 is driven by a driver circuit 118 that is supplied by the voltage $V_{drv}$ and receives the complement signal $\overline{PWM_{boost}}$ of the boost PWM control signal $PWM_{boost}$. The switches HS1, LS1, HS2 and LS2 may include (e.g., consist of) n-channel metal-oxide-semiconductor (NMOS) transistors, e.g., power NMOS transistors. An inductive component L (e.g., an inductor, possibly external to the integrated circuit of the converter 10) may be arranged between the half-bridge intermediate nodes 106 and 114 to provide a full-bridge switching architecture. The driver circuits 108, 110, 116 and 118 receive the respective PWM control signals (e.g., activation signals) from a logic circuit 120 that is configured to control operation of the DC-DC converter 10 (e.g., to modulate the duty-cycle of the control signals $PWM_{buck}$ and $PWM_{boost}$ and their complement signals so as to produce an output voltage $V_{out}$ having the expected DC value). An input capacitor $C_{in}$ (e.g., external to the integrated circuit of the converter 10) may be arranged between the input node 102 and the ground node 104. An output capacitor $C_{out}$ (e.g., external to the integrated circuit of the converter 10) may be arranged between the output node 112 and the ground node 104.

Therefore, a buck-boost DC-DC converter 10 as exemplified in FIG. 1 may be understood as a cascade arrangement of a "pure" buck converter (including switches HS1 and LS1) and a "pure" boost converter (including switches HS2 and LS2) that share an inductive component L arranged between their intermediate nodes 106 and 114.

Despite an increased architecture complexity with respect to a pure buck converter or pure boost converter, a buck-boost converter may facilitate operation when $V_{out} \approx V_{in}$ and may also operate as a pure buck or pure boost converter depending on the (instantaneous) system demands. In particular, for a buck-boost converter as exemplified in FIG. 1, three operation modes can be identified.

Figure 2:
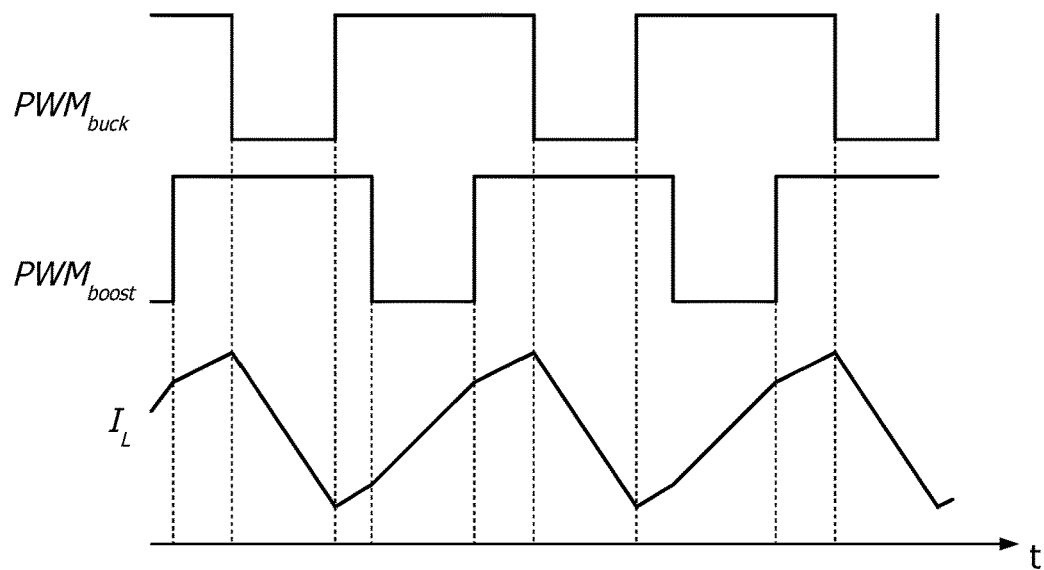
FIG. 2 is a time diagram exemplary of the possible behavior of the buck and boost PWM control signals and of the inductor current in a buck-boost DC-DC converter that operates in buck-boost mode.

In a first operation mode (buck-boost mode), particularly suitable when $V_{out} \approx V_{in}$, both half-bridges switch (usually at the same frequency) under control of the respective signals $PWM_{buck}$ and $PWM_{boost}$ and produce a current $I_L$ in the inductor L that has a four-phase profile as exemplified in the time diagram of FIG. 2. The ratio between the input voltage $V_{in}$ and the output voltage $V_{out}$ depends on the duty-cycle $D_{buck}$ and $D_{boost}$ of signals $PWM_{buck}$ and $PWM_{boost}$ that drive the two half-bridges: $V_{out} = D_{buck}/D_{boost} * V_{in}$.

Figure 3:
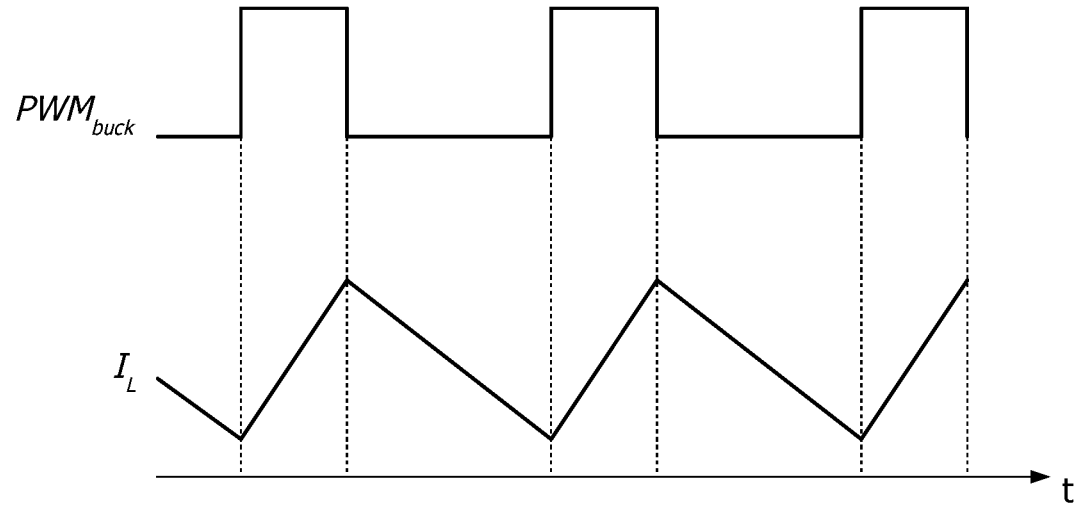
FIG. 3 is a time diagram exemplary of the possible behavior of the buck PWM control signal and of the inductor current in a buck-boost DC-DC converter that operates in buck mode.

In a second operation mode (buck mode), suitable when $V_{out} < V_{in}$, only the buck-operating half bridge (including switches HS1, LS1) switches under control of signal $PWM_{buck}$, while the boost-operating half-bridge (including switches HS2, LS2) is kept in a high-side-on condition, i.e., with the high-side switch HS2 always conductive (ON) and the low-side switch LS2 always non-conductive (OFF). Such operation produces a current $I_L$ in the inductor L that has a two-phase profile as exemplified in the time diagram of FIG. 3. The ratio between the input voltage $V_{in}$ and the output voltage $V_{out}$ depends, at least as a first approximation, on the duty-cycle $D_{buck}$ of signal $PWM_{buck}$ that drives the first half-bridge HS1, LS1: $V_{out}=D_{buck}*V_{in}$.

Figure 4:
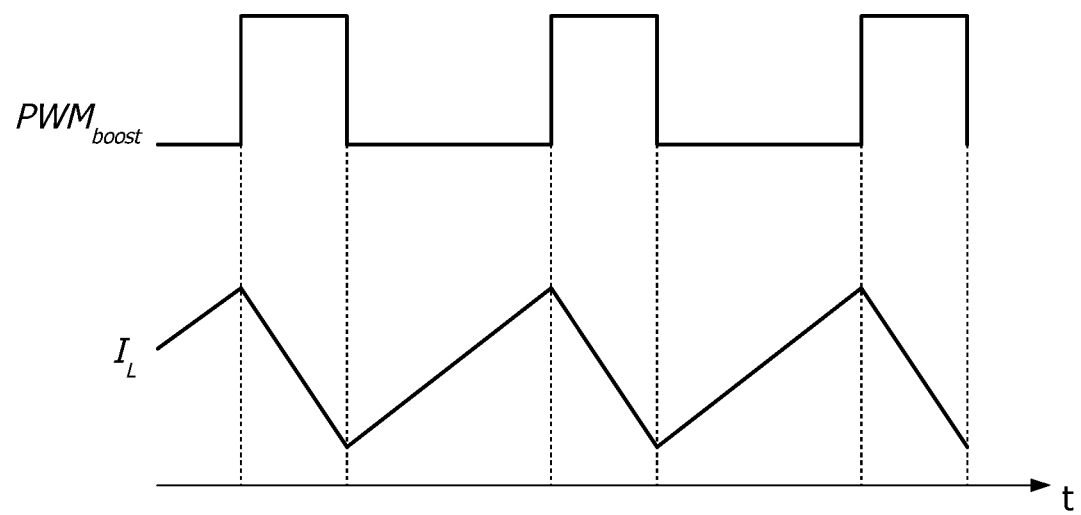
FIG. 4 is a time diagram exemplary of the possible behavior of the boost PWM control signal and of the inductor current in a buck-boost DC-DC converter that operates in boost mode.

In a third operation mode (boost mode), suitable when $V_{out}>V_{in}$, only the boost-operating half bridge (including switches HS2, LS2) switches under control of signal $PWM_{boost}$, while the buck-operating half-bridge (including switches HS1, LS1) is kept in a high-side-on condition, i.e., with the high-side switch HS1 always conductive (ON) and the low-side switch LS1 always non-conductive (OFF). Such operation produces a current $I_L$ in the inductor L that has a two-phase profile as exemplified in the time diagram of FIG. 4. The ratio between the input voltage $V_{in}$ and the output voltage $V_{out}$ depends, at least as a first approximation, on the duty-cycle $D_{boost}$ of signal $PWM_{boost}$ that drives the second half-bridge HS2, LS2: $V_{out}=V_{in}/D_{boost}$.

The architecture of the power switching stage of a DC-DC converter may be designed in order to improve the converter power efficiency while keeping a low silicon area occupation. In this context, as exemplified in FIG. 1, the low-side switches LS1 and LS2 are usually implemented as n-channel MOS (NMOS) power transistors driven by driver circuits 110 and 118 that are supplied with a supply voltage $V_{drv}$ (referred to the ground voltage $V_{gnd}$ at node 104) usually available within the semiconductor chip. The high-side switches HS1 and HS2, which operate at a higher voltage, could in principle be implemented as p-channel MOS (PMOS) power transistors. However, the resistance of a PMOS transistor is typically three to five times higher than the resistance of an NMOS transistor having the same area, so that implementing the high-side switches HS1 and HS2 as PMOS transistors would result in a much higher area occupation in order to achieve similar performance. Therefore, as exemplified in FIG. 1, the high-side switches HS1 and HS2 can also be implemented as NMOS transistors, so that the area of the power switching stage of the DC-DC converter 10 can be kept low and the efficiency can be improved. This solution, however, relies on the implementation of high-side driver circuits 108 and 116 whose reference voltage (or floating ground) needs to track the voltage $V_{SW1}$ or $V_{SW2}$ at the intermediate node 106 or 114 of the respective half-bridge (i.e., the floating ground of driver circuit 108 tracks the voltage $V_{SW1}$ at node 106 and the floating ground of driver circuit 116 tracks the voltage $V_{SW2}$ at node 114).

Figure 5:
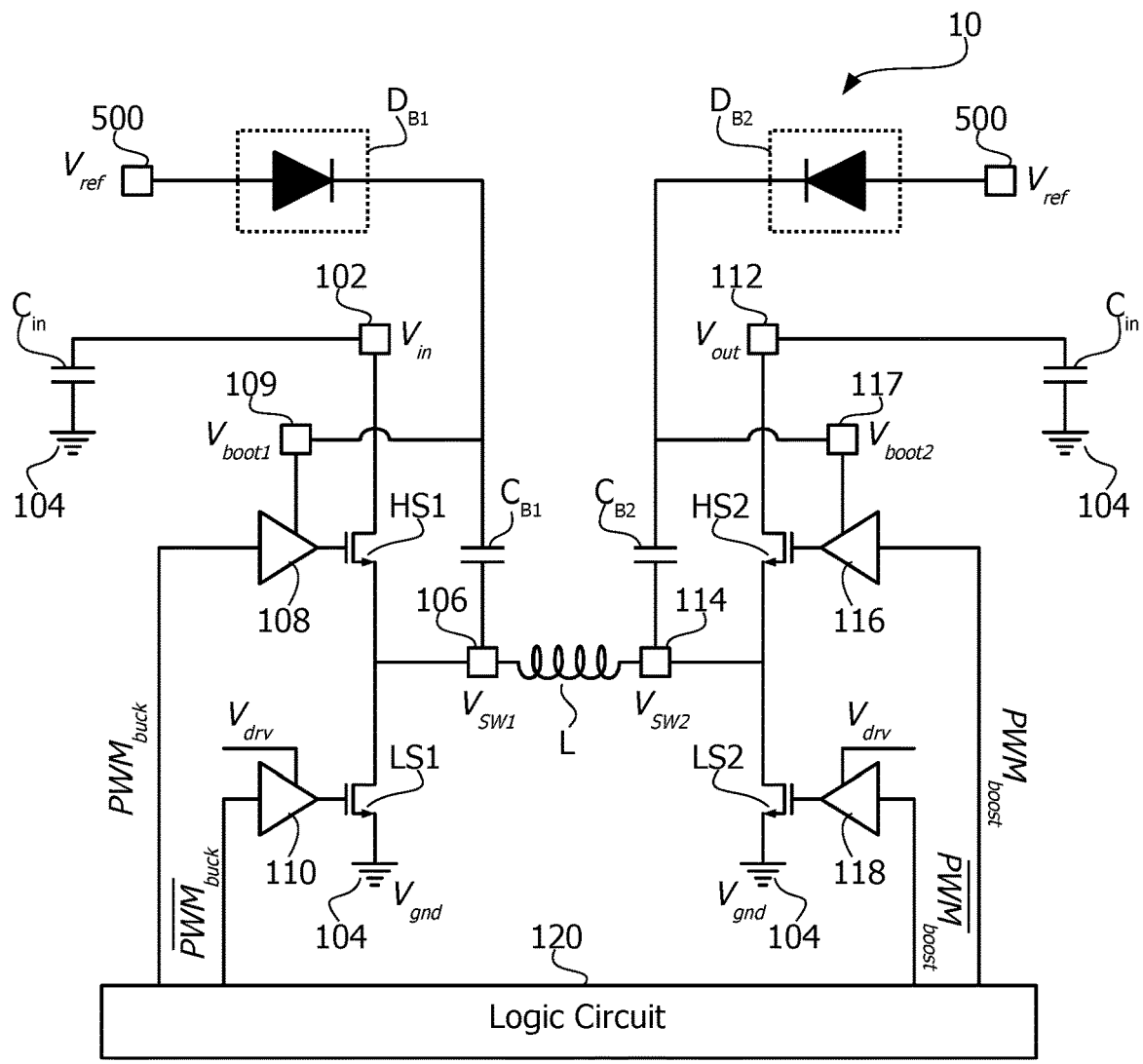
FIG. 5 is a circuit diagram exemplary of a buck-boost DC-DC converter including bootstrap circuitry configured to supply the high-side driver circuits.

As exemplified in FIG. 5, the DC-DC converter 10 may therefore include circuitry configured to produce the supply voltages $V_{boot1}$ and $V_{boot2}$ for the driver circuits 108 and 116 starting, respectively, from the voltage levels $V_{SW1}$ and $V_{SW2}$ at nodes 106 and 114. Voltage $V_{boot1}$ may be higher than voltage $V_{SW1}$ (at least) by a quantity $V_{drv}$, and voltage $V_{boot2}$ may be higher than voltage $V_{SW2}$ (at least) by a quantity $V_{drv}$. Additionally, the supply nodes 109 and 117 may be able to provide a sufficient amount of charge to charge the gate capacitance of the respective high-side switches HS1 and HS2 via the respective driver circuits 108 and 116. Therefore, a first bootstrap capacitance $C_{B1}$ (e.g., an off-chip discrete capacitor) may be coupled between node 106 and the supply node 109, and a second bootstrap capacitance $C_{B2}$ (e.g., an off-chip discrete capacitor) may be coupled between node 114 and the supply node 117. The capacitors $C_{B1}$ and $C_{B2}$ may have a large capacitance, e.g., equal to or higher than 100 nF.

The capacitances $C_{B1}$ and $C_{B2}$ may be charged in a controlled manner so as to produce the expected supply voltages $V_{boot1}$ and $V_{boot2}$ and provide the correct voltage across the high-side driver circuits 108 and 116. The DC-DC converter 10 may thus include a first bootstrap circuit $D_{B1}$ (exemplified in FIG. 5 as a diode, but possibly implemented as a switch in alternative embodiments) coupled between node 109 and a node 500 that provides a reference voltage $V_{ref}$, and a second bootstrap circuit $D_{B2}$ (exemplified in FIG. 5 as a diode, but possibly implemented as a switch in alternative embodiments) coupled between node 117 and node 500 that provides the reference voltage $V_{ref}$, with the reference voltage $V_{ref}$ being equal to or higher than the supply voltage $V_{drv}$.

The bootstrap circuits $D_{B1}$ and $D_{B2}$ are configured to charge the capacitances $C_{B1}$ and $C_{B2}$ in accordance with the timing of the respective half-bridge circuit. In particular, during the low-side ON phase, the half-bridge intermediate node (106 or 114) is driven to the ground voltage $V_{gnd}$ via the respective low-side switch (LS1 or LS2), resulting in the respective bootstrap capacitance ($C_{B1}$ or $C_{B2}$) being charged via the respective bootstrap circuit ($D_{B1}$ or $D_{B2}$) that is supplied by the reference voltage $V_{ref} \geq V_{drv}$. During the high-side ON phase, the bootstrap capacitor ($C_{B1}$ or $C_{B2}$) should be able to provide enough energy (charge) to supply the respective driver circuit (108 or 116) and turn on the respective high-side switch (HS1 or HS2), without leaking current towards node 500 via the respective bootstrap circuit ($D_{B1}$ or $D_{B2}$). A possible implementation of the bootstrap circuits $D_{B1}$ and $D_{B2}$ may thus rely on respective diodes arranged to be conductive (only) from node 500 towards nodes 109 and 117, respectively. Another implementation of the bootstrap circuits $D_{B1}$ and $D_{B2}$ may rely on a pair of switches $D_{B1}$ and $D_{B2}$ driven in a synchronized manner with the switching activity of the full-bridge architecture (e.g., with switch $D_{B1}$ being conductive during the ON phase of the low-side switch LS1 and non-conductive during the ON phase of the high-side switch HS1, and switch $D_{B2}$ being conductive during the ON phase of the low-side switch LS2 and non-conductive during the ON phase of the high-side switch HS2).

Bootstrap circuitry $C_{B1}$, $D_{B1}$, $C_{B2}$, $D_{B2}$ as disclosed with reference to FIG. 5 may not be compatible with operation of the buck-boost DC-DC converter 10 in pure buck mode, during which the high-side switch HS2 is kept always conductive (ON), and in pure boost mode, during which the high-side switch HS1 is kept always conductive (ON). In fact, in these operation modes the bootstrap capacitance coupled to the half-bridge that is statically driven (i.e., not switching) would not be re-charged by the respective bootstrap circuit (or would be charged only once, at start-up of the converter 10). Even if the statically driven half-bridge does not switch, the respective bootstrap capacitance would discharge during time (e.g., due to current leakage effects), resulting in the respective high-side switch turning off after a certain time interval.

Figure 6:
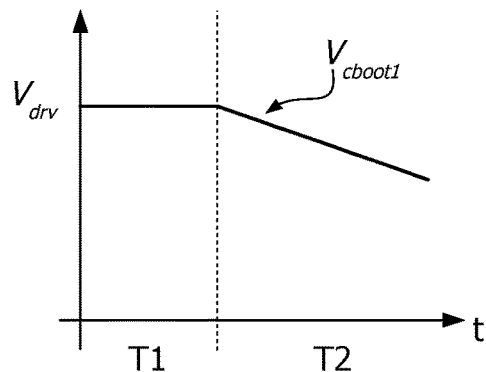
FIG. 6 is a time diagram exemplary of the possible behavior of the supply voltage of the high-side buck driver circuit in the DC-DC converter of FIG. 5, when operation of the DC-DC converter passes from buck mode or buck-boost mode to boost mode.

For instance, FIG. 6 is a time diagram exemplary of the possible behavior of voltage $V_{cboot1}$ across capacitance $C_{B1}$ (i.e., between nodes 109 and 106) when operation of the DC-DC converter 10 passes from buck mode or buck-boost mode (interval T1) to pure boost mode (interval T2). In pure boost mode, the bootstrap circuit $D_{B1}$ is inhibited (i.e., it is not conductive) since the following condition on voltage $V_{ref}$ and voltage $V_{boot1}$ applies:

$$V_{ref} < V_{boot1} = V_{SW1} + V_{drv} = V_{in} + V_{drv}.$$

Therefore, capacitor $C_{B1}$ discharges due to leakage.

Figure 7:
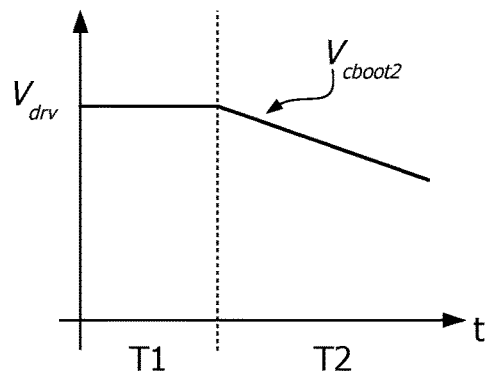
FIG. 7 is a time diagram exemplary of the possible behavior of the supply voltage of the high-side boost driver circuit in the DC-DC converter of FIG. 5, when operation of the DC-DC converter passes from boost mode or buck-boost mode to buck mode.

Similarly, FIG. 7 is a time diagram exemplary of the possible behavior of voltage $V_{cboot2}$ across capacitor $C_{B2}$ (i.e., between nodes 117 and 114) when operation of the DC-DC converter 10 passes from boost mode or buck-boost mode (interval T1) to pure buck mode (interval T2). In pure buck mode, the bootstrap circuit $D_{B2}$ is inhibited (i.e., it is not conductive) since the following condition on voltage $V_{ref}$ and voltage $V_{boot2}$ applies:

$$V_{ref} < V_{boot2} = V_{SW2} + V_{drv} = V_{out} + V_{drv}.$$

Therefore, capacitor $C_{B2}$ discharges due to leakage.

Figure 8:
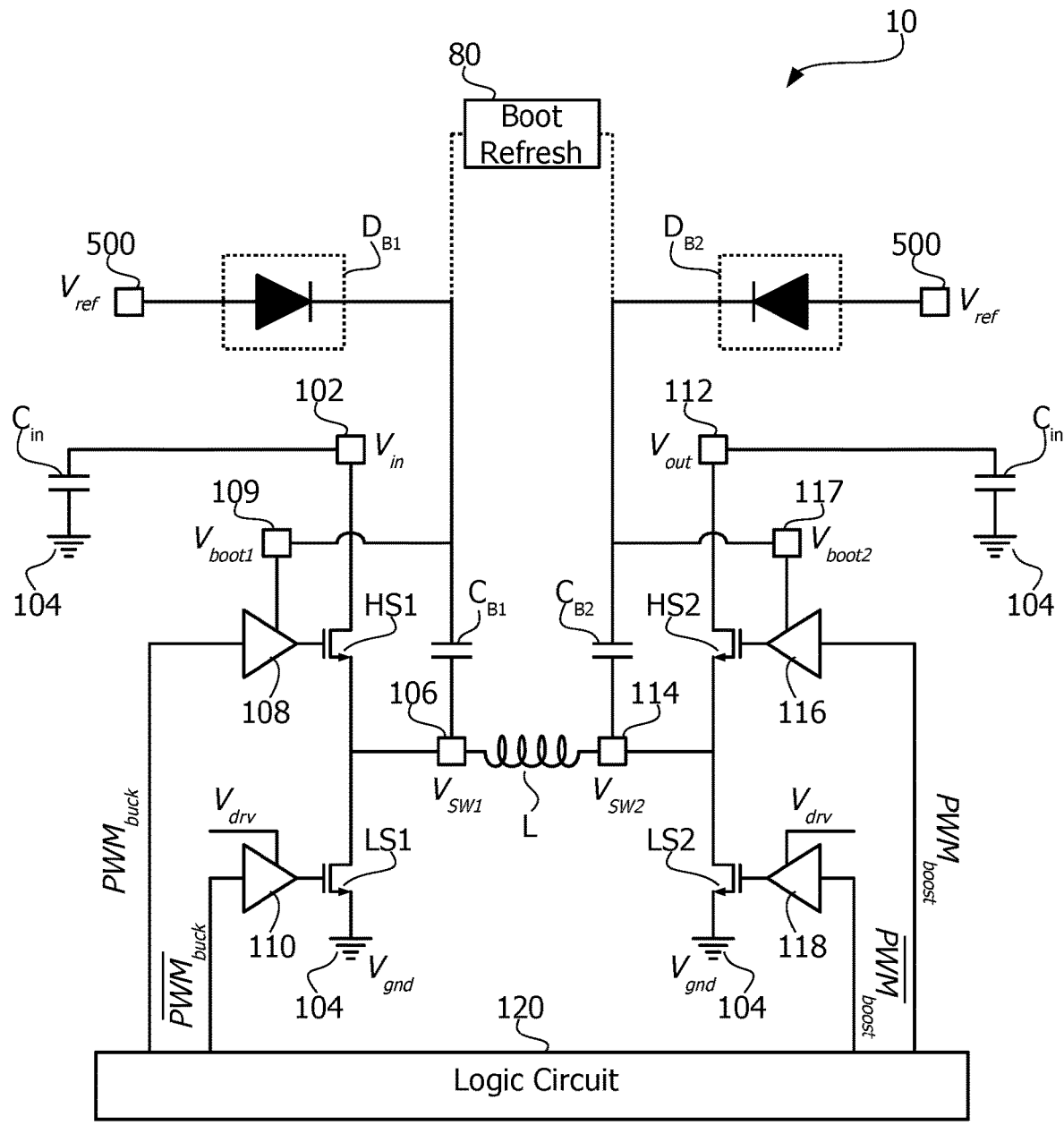
FIG. 8 is a circuit diagram exemplary of a buck-boost DC-DC converter according to one or more embodiments of the present description, including bootstrap circuitry configured to supply the high-side driver circuits and boot refresher circuitry.

A possible solution that makes the bootstrap circuitry $C_{B1}$, $D_{B1}$, $C_{B2}$, $D_{B2}$ compatible with operation of the buck-boost DC-DC converter 10 in pure buck mode and in pure boost mode relies on additional "boot refresher" circuitry 80 coupled to the capacitances $C_{B1}$ and $C_{B2}$, as exemplified in the circuit diagram of FIG. 8. The boot refresher circuitry 80 is configured to maintain a proper voltage $V_{cboot1}$ (or $V_{cboot2}$) on the bootstrap capacitance $C_{B1}$ (or $C_{B2}$) when there is no switching activity at the respective intermediate node 106 (or 114), by relying on the switching activity at the other intermediate node 114 (or 106). Substantially, since in pure buck mode (or boost mode) the switching half-bridge HS1, LS1 (or HS2, LS2) has its "active" bootstrap capacitance $C_{B1}$ (or $C_{B2}$) charged at a voltage $V_{boot1}$ (or $V_{boot2}$) that is higher than the voltage $V_{boot2}$ (or $V_{boot1}$) at the other bootstrap capacitance $C_{B2}$ (or $C_{B1}$) the "active" bootstrap capacitance $C_{B1}$ (or $C_{B2}$) can be used to charge the other bootstrap capacitance $C_{B2}$ (or $C_{B1}$). Document US 2019/0326817 A1 is exemplary of a buck-boost converter that includes a bootstrap voltage refresh circuit.

Figure 9:
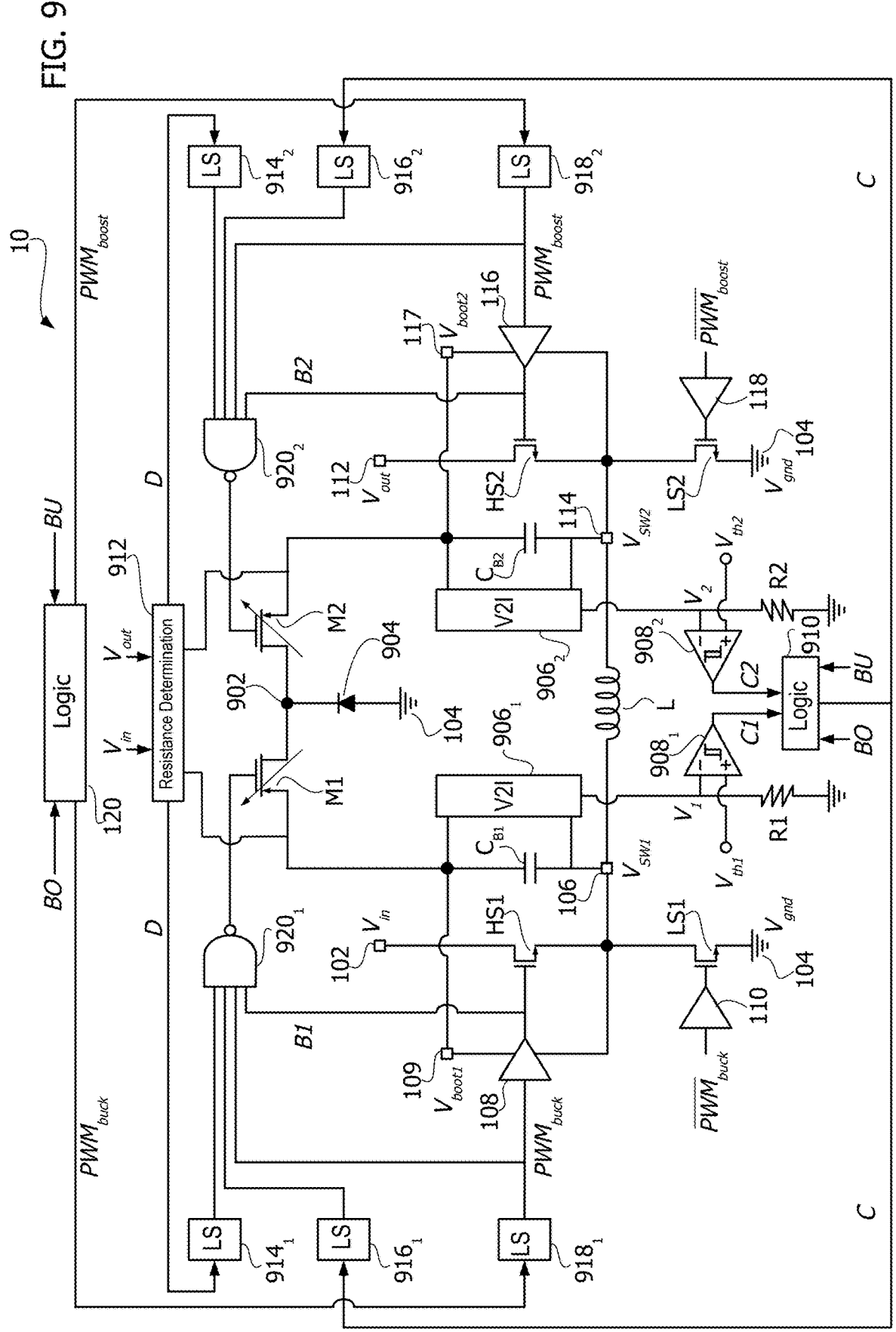
FIG. 9 is a circuit diagram exemplary of implementation details of a buck-boost DC-DC converter according to one or more embodiments of the present description.

FIG. 9 is a circuit diagram exemplary of a buck-boost DC-DC converter 10 according to one or more embodiments, which includes a bootstrap refresher circuitry that operates according to the principles described with reference to FIG. 8. It is noted that some components of the converter 10 may not be visible in FIG. 9 for the sake of ease of illustration (e.g., the (external) capacitors $C_{in}$ and $C_{out}$ coupled to nodes 102 and 112, respectively, as well as the bootstrap circuits $D_{B1}$ and $D_{B2}$ coupled to nodes 109 and 117, respectively).

As exemplified in FIG. 9, one or more embodiments may include a first switch M1 and a second switch M2 directly connected in series between node 109 and node 117. For instance, the first switch M1 may be directly connected between node 109 and an intermediate node 902, and the second switch M2 may be directly connected between node 117 and the intermediate node 902. The switches M1, M2 may include (e.g., consist of) PMOS transistors; for instance, a first PMOS transistor M1 may have a source terminal coupled to node 109 and a drain terminal coupled to node 902, and a second PMOS transistor M2 may have a source terminal coupled to node 117 and a drain terminal coupled to node 902 so that, during operation, the body diodes of transistors M1 and M2 (not visible in FIG. 9) are arranged in opposite direction (e.g., "back-to-back").

A diode 904 may be coupled between node 902 and the ground node 104, conductive from node 104 towards node 902 (e.g., having an anode terminal coupled to the ground node 104 and a cathode terminal coupled to the intermediate node 902). The diode 904 may operate as a clamp circuit, avoiding an uncontrolled negative voltage drift of node 902 when the voltage refresher circuit is inactive (e.g., off).

When the DC-DC converter 10 operates in pure buck mode or in pure boost mode, the switches M1, M2 can be activated in a synchronized manner with signals $PWM_{buck}$ or $PWM_{boost}$ (as further discussed in the following) to charge the bootstrap capacitances $C_{B1}$ or $C_{B2}$ (e.g., to transfer charge from one bootstrap capacitance to the other).

One or more embodiments may thus advantageously not include any diode arranged between nodes 109 and 117. The absence of diodes in the current path between nodes 109 and 117 may result in a lower silicon area of the converter circuit 10, and/or in a wider voltage operating range in which the bootstrap capacitances $C_{B1}$ and $C_{B2}$ can mutually transfer energy from one to the other. For instance, in the known solution disclosed by document US 2019/0326817 A1 previously cited, which includes diodes in the current path between the two bootstrap capacitances, the voltage $V_{high}$ across one bootstrap capacitance has to be higher than the voltage $V_{low}$ across the other bootstrap capacitance at least by a quantity $V_{diode}$ ($V_{high} \geq V_{low} + V_{diode}$) corresponding to a diode threshold voltage in order to allow transfer of charge from one bootstrap capacitance to the other. Conversely, in one or more embodiments as exemplified in FIG. 9, transfer of charge from one bootstrap capacitance ($C_{B1}$ or $C_{B2}$) to the other bootstrap capacitance ($C_{B2}$ or $C_{B1}$, respectively) may take place provided that the voltage $V_{high}$ across one bootstrap capacitance is higher than the voltage $V_{low}$ across the other bootstrap capacitance ($V_{high} \geq V_{low}$). This results in an improved uniformity of the voltage across the bootstrap capacitance that gets recharged at varying values of the input voltage $V_{in}$ and/or of the output voltage $V_{out}$, which in turn facilitates a more uniform operation of the driver circuits 108, 116.

In one or more embodiments, switches M1 and M2 may be controlled (as further discussed in the following) in order to prevent the bootstrap capacitance coupled to the "steady" half-bridge from discharging via the low-side switch of the "switching" half-bridge. This may be achieved by opening (e.g., turning off) the switches M1 and M2 when the low-side switch of the "switching" half-bridge is conductive. In particular, during pure buck mode operation, switches M1 and M2 may be opened (e.g., turned off) when the low-side buck switch LS1 is conductive (e.g., on). Similarly, during pure boost mode operation, switches M1 and M2 may be opened (e.g., turned off) when the low-side boost switch LS2 is conductive (e.g., on).

Additionally, in one or more embodiments the switches M1, M2 (e.g., PMOS transistors) may be dimensioned so as to have a resistance value in the ON state that prevents the bootstrap capacitances $C_{B1}$ and $C_{B2}$ from over-charging. In fact, switches M1, M2 may be controlled as a function of the voltage sensed across the bootstrap capacitances $C_{B1}$ and $C_{B2}$ by respective comparator circuits coupled thereto. The comparator circuits may operate in a high-voltage domain and may be affected by latency insofar as the sensed information (i.e., the state of charge of capacitances $C_{B1}$ and $C_{B2}$) is transmitted from the high-voltage domain to the low-voltage domain via dedicated level shifter circuits. During such latency, the bootstrap capacitance that is being re-charged (i.e., the bootstrap capacitance that is coupled to the "steady" half-bridge) may continue to be charged as a function of (e.g., proportionally to) the voltage $\Delta V$ across the switches M1, M2 (i.e., the voltage sensed between nodes 109 and 117). In order to avoid over-charging the bootstrap capacitance, the threshold voltages of the comparators and the ON-resistance value of switches M1, M2 may be selected accordingly.

In one or more embodiments, since the DC-DC converter 10 may operate in a wide range of input voltage $_{in}$ and/or output voltage $V_{out}$, the switches M1, M2 may include (e.g., consist of) switches having a variable and selectable resistance. Therefore, the ON-resistance of switches M1, M2 may be selected as a function of the voltage $\Delta V$ sensed between nodes 109 and 117. For instance, each switch M1, M2 may include a plurality of PMOS transistors connected in parallel, with each parallel-connected transistor being selectively activatable in order to provide a certain resistance between nodes 109 and 117. Selection of one or more of the parallel-connected transistors within switches M1, M2 may be made as a function of voltage ΔV between nodes 109 and 117. For instance, under the assumption that the voltages $V_{cboot1}$ and $V_{cboot2}$ across the bootstrap capacitances $C_{B1}$ and $C_{B2}$ are approximately the same, the voltage ΔV between nodes 109 and 117 may be approximately equal to the difference between the input voltage $V_{in}$ at node 102 and the output voltage $V_{out}$ at node 112: $\Delta V = |V_{in} - V_{out}|$. Therefore, in one or more embodiments the value of resistance of switches M1, M2 (e.g., the number of parallel-connected PMOS transistors activated) may be selected as a function of the values of $V_{in}$ and $V_{out}$ (either directly sensed, or indirectly determined).

The operating principles discussed above will be further explained with reference to the circuit diagram of FIG. 9.

As previously discussed, a DC-DC buck-boost converter 10 according to one or more embodiments may include a logic circuit 120 configured to control operation of the DC-DC converter 10 by producing the control signals $PWM_{buck}$ and $PWM_{boost}$ (and their complement signals) for the driver circuits 108, 110, 116 and 118 so as to produce an output voltage $V_{out}$ having the expected DC value (e.g., as a function of the output from a control loop of the converter 10). The logic circuit 120 may receive a first control signal BO that, when asserted (e.g., BO='1'), indicates that the converter 10 operates in boost mode, and a second control signal BU that, when asserted (e.g., BU='1'), indicates that the converter 10 operates in buck mode. If both signals BO and BU are asserted, the converter 10 operates in buck-boost mode.

As exemplified in FIG. 9, one or more embodiments may include control circuitry configured to sense the voltage across the bootstrap capacitances $C_{B1}$, $C_{B2}$ and produce an activation signal C for the switches M1, M2 as a function of the sensed voltages. In particular, the voltage across capacitance $C_{B1}$ may be compared to a first threshold value $V_{th1}$ and the voltage across capacitance $C_{B2}$ may be compared to a second threshold value $V_{th2}$ (possibly with $V_{th1}=V_{th2}$).

For instance, one or more embodiments may include a voltage-to-current (V2I) converter circuit $906_1$ coupled to capacitance $C_{B1}$ and configured to produce an output current indicative of (e.g., proportional to) the voltage $V_{cboot1}$ across capacitance $C_{B1}$. The output current from the V2I converter circuit $906_1$ may be injected into a resistance R1 coupled to the ground node 104 to produce a voltage signal $V_1$ indicative of (e.g., proportional to) voltage $V_{cboost1}$. A comparator circuit $908_1$ (e.g., a comparator with hysteresis) may receive at a first (e.g., inverting) input the voltage signal $V_1$ and at a second (e.g., non-inverting) input the threshold signal $V_{th1}$, and may produce an output signal C1 as a function of the comparison. For instance, signal C1 may be asserted (e.g., C1='1') when $V_1 < V_{th1}$.

Similarly, one or more embodiments may include a voltage-to-current (V2I) converter circuit $906_2$ coupled to capacitance $C_{B2}$ and configured to produce an output current indicative of (e.g., proportional to) the voltage $V_{cboot2}$ across capacitance $C_{B2}$. The output current from the V2I converter circuit $906_2$ may be injected into a resistance R2 (e.g., equal to R1) coupled to the ground node 104 to produce a voltage signal $V_2$ indicative of (e.g., proportional to) voltage $V_{cboot2}$. A comparator circuit $908_2$ (e.g., a comparator with hysteresis) may receive at a first (e.g., inverting) input the voltage signal $V_2$ and at a second (e.g., non-inverting) input the threshold signal $V_{th2}$, and may produce an output signal C2 as a function of the comparison. For instance, signal C2 may be asserted (e.g., C2='1') when $V_2 < V_{th2}$.

A (combinatorial) logic circuit 910 receives signals C1, C2, BO and BU and produces an output activation signal C according to the following logic: if signal BO is asserted (e.g., BO='1') and signal BU is de-asserted (e.g., BU='0') then C=C1 (i.e., circuit 910 passes signal C1 to the output); if signal BO is de-asserted (e.g., BO='0') and signal BU is asserted (e.g., BU='1') then C=C2 (i.e., circuit 910 passes signal C2 to the output); if signal BO is asserted and signal BU is asserted (e.g., BO='1' and BU='1') then C='0'.

More generally, the logic operation of circuit 910 described above results in that: if the converter 10 is operating in pure boost mode, the switches M1 and M2 may be activated when the voltage $V_{cboot1}$ across capacitance $C_{B1}$ is below a certain threshold (i.e., when an undervoltage condition is detected on capacitance $C_{B1}$); if the converter 10 is operating in pure buck mode, the switches M1 and M2 may be activated when the voltage $V_{cboot2}$ across capacitance $C_{B2}$ is below a certain threshold (i.e., when an undervoltage condition is detected on capacitance $C_{B2}$); and if the converter 10 is operating in buck-boost mode, the switches M1 and M2 may not be activated.

It is noted that voltage $V_{cboot1}$ and voltage $V_{cboot2}$ across capacitances $C_{B1}$ and $C_{B2}$ are referred to the floating ground nodes 106 and 114 (i.e., in the high voltage section of converter 10), and provision of the V2I converter circuits $906_1$ and $906_2$ facilitates comparing these voltages to the threshold values $V_{th1}$ and $V_{th2}$ in the low-voltage section of converter 10, thereby allowing the use of low-voltage comparators $908_1$ and $908_2$. It will be understood that different embodiments may include a different voltage sensing architecture configured to produce signals C1 and C2 indicative of the voltages $V_{cboot1}$ and $V_{cboot2}$ across the bootstrap capacitances $C_{B1}$ and $C_{B2}$. For instance, one or more embodiments may comprise two comparator circuits implemented in the floating voltage section (i.e., referenced to the switching nodes 106 and 114, respectively) and configured to produce respective logic signals as a function of a direct sensing of voltage $V_{cboot1}$ across capacitance $C_{B1}$ and voltage $V_{cboot2}$ across capacitance $C_{B2}$. Such logic signals may be fed to respective level shifter circuits to produce the logic signals C1 and C2 for the logic circuit 910.

As exemplified in FIG. 9, one or more embodiments may include a circuit 912 configured to determine the appropriate resistance of switches M1, M2 when in the ON state, as a function of the voltage difference between supply nodes 109 and 117, which may be determined as a voltage difference between the input voltage $V_{in}$ and the output voltage $V_{out}$. In particular, if each switch M1, M2 includes a plurality of MOS transistors connected in parallel, the circuit 912 may be configured to determine a number of such parallel-connected transistors to be activated simultaneously. Circuit 912 may thus generate an output signal D indicative of a number of transistors to be activated. For instance, signal D may include an N-bit signal, where N is the number of parallel-connected transistors included in each of switches M1 and M2, with each bit of signal D being intended to control a respective transistor in the switches M1, M2.

As previously discussed, the resistance value of switches M1, M2 may be selected substantially as a function of the difference between the input voltage $V_{in}$ and the output voltage $V_{out}$. For instance, in one or more embodiments the circuit 912 may determine the number of transistors to be activated as a function of a look-up table that correlates the difference between $V_{in}$ and $V_{out}$ to a certain number of transistors that have to be activated. In one or more embodiments, the output voltage $V_{out}$ may be generally known insofar as it is set by the application, while information on the input voltage $V_{in}$ may need to be gathered.

In one or more embodiments, the input voltage $V_{in}$ may be sensed by a dedicated voltage sensor circuit, may be converted to a digital value by an analog-to-digital (A/D) converter, and may eventually be compared with the output voltage $V_{out}$.

In one or more embodiments, in order to avoid implementing a dedicated input voltage sensor and/or a dedicated A/D converter, information on the input voltage $V_{in}$ may be determined indirectly by relying on the value of the output voltage $V_{in}$ and on the value of the duty-cycle $D_{buck}$ of signal $PWM_{buck}$ and/or the value of the duty-cycle $D_{boost}$ of signal $PWM_{boost}$, since $D_{buck}=V_{out}/V_{in}$ and $D_{boost}=V_{in}/V_{out}$. Therefore, in one or more embodiments the value of resistance of switches M1, M2 (e.g., the number of parallel-connected PMOS transistors that are to be activated) may be selected as a function of the output voltage $V_{out}$ and of indirect determination of the input voltage $V_{in}$. The values of the duty-cycle $D_{buck}$ and/or $D_{boost}$ can be determined, for instance, by resorting to a "fast" clock signal that conventionally drives a pair of digital counters that count the actual duration of the high-side-on phases of signals $PWM_{buck}$ and $PWM_{boost}$. Once $D_{buck}$ and/or $D_{boost}$ are measured, $V_{in}$ can be computed indirectly as $V_{in}=V_{out}/D_{buck}$ and/or $V_{in}=V_{out}D_{boost}$.

In one or more embodiments, the signal D produced by circuit 912 may be fed to respective level shifter circuits $914_1$, $914_2$ that shift the voltage level of signal D from the low-voltage section to the floating ground section of the converter 10. Each bit of the N-bit signal D may be fed to a respective voltage shifter circuit $914_1$, $914_2$. Similarly, signal C produced by the logic circuit 910 may be fed to respective level shifter circuits $916_1$, $916_2$ that shift the voltage level of signal C from the low-voltage section to the floating ground section of the converter 10. Similarly, signals $PWM_{buck}$ and $PWM_{boost}$ produced by the logic circuit 120 may be fed to respective level shifter circuits $918_1$, $918_2$ that shift the voltage level of signals $PWM_{buck}$ and $PWM_{boost}$ from the low-voltage section to the floating ground section of the converter 10.

In one or more embodiments, each parallel-connected transistor in the switches M1 and M2 may receive a respective control (e.g., activation) signal that is produced at the output of a respective logic gate $920_1$, $920_2$ as a combination of various control signals. In particular, each transistor in the switches M1, M2 may be coupled to the output of a respective NAND logic gate that combines a plurality of (e.g., four) input signals. A first input signal to each NAND logic gate $920_1$, $920_2$ may be the respective high-side ON signal produced by the PWM generator circuit 120 (i.e., signal $PWM_{buck}$ for gates $920_1$ and signal $PWM_{boost}$ for gates $920_2$), which indicates that the respective high-side switch (HS1 or HS2) is expected to be active. A second input signal to each NAND logic gate $920_1$, $920_2$ may be the respective Vgs ON signal produced by the driver circuits 108 and 116 (i.e., the output signal B1 from driver 108 for gates $920_1$ and the output signal B2 from driver 116 for gates $920_2$), which indicates that the respective high-side switch (HS1 or HS2) is actually activated by the corresponding driver circuit. A third input signal to each NAND logic gate $920_1$, $920_2$ may be the signal C produced by the circuit 910, which indicates that the respective bootstrap capacitance ($C_{B1}$ or $C_{B2}$) is to be charged. A fourth input signal to each NAND logic gate $920_1$, $920_2$ may be one bit of the signal D produced by the circuit 912, which indicates that the respective PMOS transistor in the switch M1 or M2 is to be activated.

Figure 10:
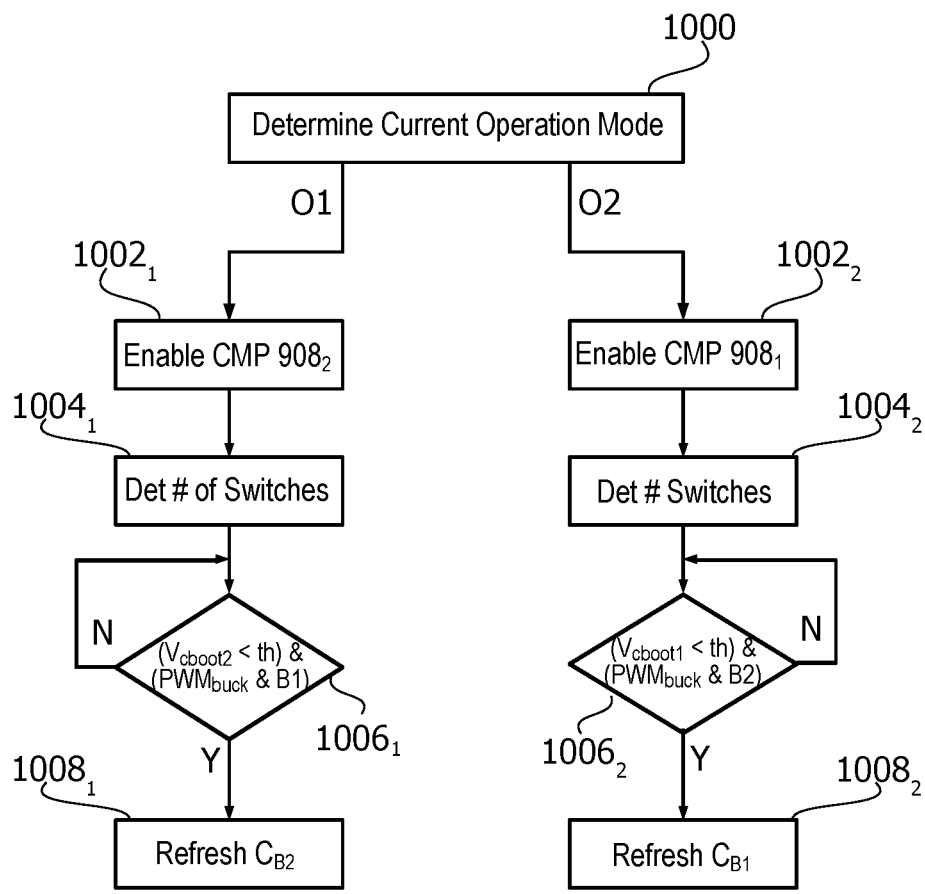
FIG. 10 is a block diagram exemplary of possible operation of a buck-boost DC-DC converter according to one or more embodiments of the present description.

Operation of a DC-DC converter 10 as exemplified in FIG. 9 may be further understood with reference to the block diagram of FIG. 10. As exemplified in FIG. 10, a first operation step 1000 may include determining the current operation mode of the converter 10, i.e., buck mode (outcome O1) or boost mode (outcome O2). In the case of buck operating mode (e.g., BU='1'), a following step $1002_1$ may include enabling comparator $908_2$ (and possibly disabling comparator $908_1$), since the state of charge of capacitance $C_{B2}$ has to be monitored. A following step $1004_1$ may include determining the number of parallel-connected transistors in switches M1, M2 that are to be activated (i.e., setting the values of the N-bit signal D). A following step $1006_1$ may include checking whether the voltage $V_{cboot2}$ across capacitance $C_{B2}$ is lower than a certain threshold and checking whether signals $PWM_{buck}$ and B1 are asserted (i.e., checking whether the high-side switch HS1 is ON). As a result of a positive outcome of step $1006_1$, in a following step $1008_1$ the bootstrap capacitance $C_{B2}$ may be refreshed by activating the switches M1, M2 (according to the values of signal D). As a result of a negative outcome of step $1006_1$, the checking step $1006_1$ may be repeated as long as the converter 10 stays in the buck operation mode. Similarly, in the case of boost operating mode (e.g., BO='1'), a step $1002_2$ following step 1000 may include enabling comparator $908_1$ (and possibly disabling comparator $908_2$), since the state of charge of capacitance $C_{B1}$ has to be monitored. A following step $1004_2$ may include determining the number of parallel-connected transistors in switches M1, M2 that are to be activated (i.e., setting the values of the N-bit signal D). A following step $1006_2$ may include checking whether the voltage $V_{cboot}$ across capacitance $C_{B1}$ is lower than a certain threshold and checking whether signals $PWM_{boost}$ and B2 are asserted (i.e., checking whether the high-side switch HS2 is ON). As a result of a positive outcome of step $1006_2$, in a following step $1008_2$ the bootstrap capacitance $C_{B1}$ may be refreshed by activating the switches M1, M2 (according to the values of signal D). As a result of a negative outcome of step $1006_2$, the checking step $1006_2$ may be repeated as long as the converter 10 stays in the boost operation mode.

In case the converter 10 is operating in buck-boost mode (e.g., BU='1' and BO='1'), none of comparators $908_1$ and $908_2$ is activated and the refresher circuit is inactive (e.g., inhibited), insofar as none of the bootstrap capacitances needs to be refreshed.

Without prejudice to the underlying principles, the details and embodiments may vary, even significantly, with respect to what has been described by way of example only, without departing from the extent of protection.

What is claimed is:

1. A buck-boost converter circuit, including:
   a first half-bridge circuit arranged between an input node configured to receive an input voltage and a ground node, the first half-bridge circuit including a first high-side switch arranged between the input node and a first switching node, and a first low-side switch arranged between the first switching node and the ground node;
   a second half-bridge circuit arranged between an output node configured to provide an output voltage and the ground node, the second half-bridge circuit including a second high-side switch arranged between the output node and a second switching node, and a second low-side switch arranged between the second switching node and the ground node;

a control circuit configured to receive a first control signal indicative, when asserted, of the buck-boost converter circuit operating in a buck mode and a second control signal indicative, when asserted, of the buck-boost converter circuit operating in a boost mode, the control circuit being further configured to produce a buck pulse-width modulated control signal and a boost pulse-width modulated control signal;

a first high-side driver circuit configured to receive the buck pulse-width modulated control signal and drive the first high-side switch as a function thereof, the first high-side driver circuit being biased between a first high-side supply voltage node and the first switching node;

a second high-side driver circuit configured to receive the boost pulse-width modulated control signal and drive the second high-side switch as a function thereof, the second high-side driver circuit being biased between a second high-side supply voltage node and the second switching node;

a first bootstrap circuit configured to be selectively conductive from a reference voltage node towards the first high-side supply voltage node;

a second bootstrap circuit configured to be selectively conductive from the reference voltage node towards the second high-side supply voltage node;

a first voltage sensing circuit configured to sense a first voltage between the first high-side supply voltage node and the first switching node, and to assert a first activation signal in response to the sensed first voltage being lower than a first threshold;

a second voltage sensing circuit configured to sense a second voltage between the second high-side supply voltage node and the second switching node, and to assert a second activation signal in response to the sensed second voltage being lower than a second threshold;

at least one charge transfer switch directly connected between the first high-side supply voltage node and the second high-side supply voltage node; and bootstrap refresher control circuitry configured to close the at least one charge transfer switch in response to:
the first control signal being asserted, the first high-side switch being conductive and the second activation signal being asserted, or
the second control signal being asserted, the second high-side switch being conductive and the first activation signal being asserted;

wherein the at least one charge transfer switch includes at least one switch having a selectable resistance value, and wherein the bootstrap refresher control circuitry is further configured to:
determine a voltage difference between the first high-side supply voltage node and the second high-side supply voltage node, and
set a resistance value of the at least one charge transfer switch as a function of the determined voltage difference, wherein a higher resistance value of the at least one charge transfer switch is set in response to a higher value of the determined voltage difference.

2. The buck-boost converter circuit of claim 1, wherein the first high-side switch, the first low-side switch, the second high-side switch and the second low-side switch include n-channel MOS transistors.

3. The buck-boost converter circuit of claim 1, wherein the at least one charge transfer switch includes at least one p-channel MOS transistor.

4. The buck-boost converter circuit of claim 1, wherein the at least one charge transfer switch includes a first charge transfer switch directly connected between the first high-side supply voltage node and an intermediate node of a charge transfer path, and a second charge transfer switch directly connected between the second high-side supply voltage node and the intermediate node of the charge transfer path.

5. The buck-boost converter circuit of claim 1, wherein the at least one charge transfer switch includes a plurality of selectively activatable switches connected in parallel, and wherein the bootstrap refresher control circuitry is configured to produce respective control signals for activating the selectively activatable switches connected in parallel as a function of the determined voltage difference, wherein fewer switches connected in parallel are activated in response to an increased value of the determined voltage difference.

6. The buck-boost converter circuit of claim 1, wherein the bootstrap refresher control circuitry is configured to determine the voltage difference between the first high-side supply voltage node and the second high-side supply voltage node as a difference between the input voltage and the output voltage.

7. The buck-boost converter circuit of claim 1, wherein the bootstrap refresher control circuitry is configured to determine the voltage difference between the first high-side supply voltage node and the second high-side supply voltage node as a function of the output voltage and at least one of a duty-cycle of the buck pulse-width modulated control signal or a duty-cycle of the boost pulse-width modulated control signal.

8. The buck-boost converter circuit of claim 1, wherein:
the first voltage sensing circuit includes:
a first voltage-to-current converter circuit configured to produce a first output current indicative of the first voltage between the first high-side supply voltage node and the first switching node,
a first resistance coupled to a ground node and arranged to receive the first output current to produce a first voltage signal indicative of the first voltage between the first high-side supply voltage node and the first switching node, and
a first comparator configured to compare the first voltage signal to the first threshold and assert the first activation signal in response to the first voltage signal being lower than the first threshold; and
the second voltage sensing circuit includes:
a second voltage-to-current converter circuit configured to produce a second output current indicative of the second voltage between the second high-side supply voltage node (117) and the second switching node,
a second resistance coupled to the ground node and arranged to receive the second output current to produce a second voltage signal indicative of the second voltage between the second high-side supply voltage node and the second switching node, and
a second comparator configured to compare the second voltage signal to the second threshold and assert the second activation signal in response to the second voltage signal being lower than the second threshold.

9. The buck-boost converter circuit of claim 1, wherein:
the first bootstrap circuit includes a semiconductor junction having an anode terminal coupled to the reference voltage node and a cathode terminal coupled to the first high-side supply voltage node; and
the second bootstrap circuit includes a semiconductor junction having an anode terminal coupled to the reference voltage node and a cathode terminal coupled to the second high-side supply voltage node.

10. The buck-boost converter circuit of claim 1, wherein:
the first bootstrap circuit includes a first bootstrap switch arranged between the reference voltage node and the first high-side supply voltage node;
the second bootstrap circuit includes a second bootstrap switch arranged between the reference voltage node and the second high-side supply voltage node; and
the buck-boost converter circuit further includes control circuitry configured to:
close the first bootstrap switch in response to the first low-side switch being conductive and the first high-side switch being non-conductive, and
close the second bootstrap switch in response to the second low-side switch being conductive and the second high-side switch being non-conductive.

11. A method of operating the buck-boost converter circuit according to claim 1, the method including:
receiving the input voltage at the input node;
receiving, at the control circuit, the first control signal indicative, when asserted, of the buck-boost converter circuit operating in the buck mode and the second control signal indicative, when asserted, of the buck-boost converter circuit operating in the boost mode;
producing, at the control circuit, the buck pulse-width modulated control signal and the boost pulse-width modulated control signal;
receiving, at the first high-side driver circuit, the buck pulse-width modulated control signal and driving the first high-side switch as a function thereof;
receiving, at the second high-side driver circuit, the boost pulse-width modulated control signal and driving the second high-side switch as a function thereof;
sensing, by the first voltage sensing circuit, the first voltage between the first high-side supply voltage node and the first switching node, and asserting the first activation signal in response to the sensed first voltage being lower than the first threshold;
sensing, by the second voltage sensing circuit, the second voltage between the second high-side supply voltage node and the second switching node, and asserting the second activation signal in response to the sensed second voltage being lower than the second threshold; and
closing the at least one charge transfer switch in response to:
the first control signal being asserted, the first high-side switch being conductive and the second activation signal being asserted, or
the second control signal being asserted, the second high-side switch being conductive and the first activation signal being asserted.

12. A buck-boost converter circuit, comprising:
a buck-boost controller comprising:
a first voltage sensing circuit configured to be coupled to a boosted switch driver power supply node of a buck converter circuit,
a second voltage sensing circuit configured to be coupled to a boosted switch driver power supply node of a boost converter circuit,
a transfer switch controller coupled to the first voltage sensing circuit and the second voltage sensing circuit and configured to be coupled to at least one charge transfer switch coupled between the boosted switch driver power supply node of the buck converter circuit and the boosted switch driver power supply node of the boost converter circuit, the transfer switch controller configured to close the at least one charge transfer switch in response to:
a high-side switch of the buck converter circuit being conductive, the second voltage sensing circuit indicating that a voltage between the boosted switch driver power supply node of the boost converter circuit and an output node of a high-side switch of the boost converter circuit is less than a first predetermined threshold, and the buck-boost converter circuit being in a buck conversion mode, and
the high-side switch of the boost converter circuit being conductive, the first voltage sensing circuit indicating that a voltage between the boosted switch driver power supply node of the buck converter circuit and an output node of the high-side switch of the buck converter circuit is less than a second predetermined threshold, and the buck-boost converter circuit being in a boost conversion mode;
wherein:
the at least one charge transfer switch comprises a plurality of charge transfer switches connected in parallel, and
the transfer switch controller is further configured to:
activate a first number of the plurality of charge transfer switches when the first voltage sensing circuit and the second voltage sensing circuit indicates that a voltage difference between the voltage of the boosted switch driver power supply node of the boost converter circuit and the voltage of the boosted switch driver power supply node of the buck converter circuit is a first value, and
activate a second number of the plurality of charge transfer switches when the first voltage sensing circuit and the second voltage sensing circuit indicates that the voltage difference between the voltage of the boosted switch driver power supply node of the boost converter circuit and the voltage of the boosted switch driver power supply node of the buck converter circuit is a second value, wherein the first number is less than the second number, and the first value is greater than the second value.

13. The buck-boost converter circuit of claim 12, further comprising the plurality of charge transfer switches.

14. The buck-boost converter circuit of claim 12, further comprising:
a first half-bridge circuit comprising the high-side switch of the buck converter circuit and a low-side switch of the buck converter circuit, wherein the high-side switch of the buck converter circuit is connected to an input node of the buck-boost converter circuit;
a second half-bridge circuit comprising the high-side switch of the boost converter circuit and a low-side switch of the boost converter circuit, wherein the high-side switch of the boost converter circuit is connected to an output node of the buck-boost converter circuit;
a first driver circuit having a power supply input coupled to the boosted switch driver power supply node of the buck converter circuit, and outputs coupled to control nodes of the first half-bridge circuit; and
a second driver circuit having a power supply input coupled to the boosted switch driver power supply node of the boost converter circuit, and outputs coupled to control nodes of the second half-bridge circuit.

15. The buck-boost converter circuit of claim 14, further comprising:
the at least one charge transfer switch;
a first capacitor coupled between an output of the first half-bridge circuit and the boosted switch driver power supply node of the buck converter circuit; and
a second capacitor coupled between an output of the second half-bridge circuit and the boosted switch driver power supply node of the boost converter circuit.

16. The buck-boost converter circuit of claim 12, wherein:
the first voltage sensing circuit comprises a first comparator; and
the second voltage sensing circuit comprises a second comparator.

17. The buck-boost converter circuit of claim 12, wherein:
the transfer switch controller is configured to determine the voltage difference between the voltage of the boosted switch driver power supply node of the boost converter circuit and the voltage of the boosted switch driver power supply node of the buck converter circuit based on a voltage difference between a voltage at an input node of the buck-boost converter circuit and a voltage at an output node of the buck-boost converter circuit.

18. The buck-boost converter circuit of claim 12, wherein:
the transfer switch controller is configured to determine the voltage difference between the voltage of the boosted switch driver power supply node of the boost converter circuit and the voltage of the boosted switch driver power supply node of the buck converter circuit as a function of an output voltage of the buck-boost converter circuit and at least one of a duty-cycle of a pulse-width modulated control signal active in the buck conversion mode or a duty-cycle of a pulse-width modulated control signal active in the boost conversion mode.

19. A method of operating a buck-boost power supply comprising a first half-bridge circuit, a first driver circuit coupled to the first half-bridge circuit and a first boosted supply node, a second half-bridge circuit, a second driver circuit coupled to the second half-bridge circuit and a second boosted supply node, and a charge transfer switch having a variable resistance coupled between the first boosted supply node and the second boosted supply node, the method comprising:
operating the buck-boost power supply in a buck mode by:
providing a PWM signal to the first half-bridge circuit,
keeping a high-side switch of the second half-bridge circuit on and a low-side switch of the second half-bridge circuit off, and
turning on the charge transfer switch when a voltage between the second boosted supply node and an output of the second half-bridge circuit is below a first threshold;
operating the buck-boost power supply in a boost mode by:
providing a PWM signal to the second half-bridge circuit,
keeping a high-side switch of the first half-bridge circuit on and a low-side switch of the first half-bridge circuit off, and
turning on the charge transfer switch when a voltage between the first boosted supply node and an output of the first half-bridge circuit is below a second threshold;
decreasing the variable resistance of the charge transfer switch as a voltage difference between the first boosted supply node and the second boosted supply node decreases; and
increasing the variable resistance of the charge transfer switch as the voltage difference between the first boosted supply node and the second boosted supply node increases.

20. The method of claim 19, further comprising determining the voltage difference between the first boosted supply node and the second boosted supply node based on a voltage difference between a voltage at an input of the buck-boost power supply and a voltage at an output of the buck-boost power supply.

* * * * *